US009894992B2

(12) United States Patent
Berchtold et al.

(10) Patent No.: US 9,894,992 B2
(45) Date of Patent: Feb. 20, 2018

(54) DRAWER PULL-OUT GUIDE

(71) Applicant: Julius Blum GmbH, Hoechst (AT)

(72) Inventors: Pascal Berchtold, Alberschwende (AT); David Fink, Sulzberg (AT); Marc Meusburger, Egg (AT); Daniel Boch, Opfenbach (DE); Gernot Mohr, Wolfurt (AT); Albert Boesch, Gaissau (AT); Philipp Nachbauer, Meiningen (AT); Simon Grabherr, Hoechst (AT)

(73) Assignee: Julius Blum GmbH, Hoechst (AT)

( * ) Notice: Subject to any disclaimer, the term of this patent is extended or adjusted under 35 U.S.C. 154(b) by 0 days.

(21) Appl. No.: 15/207,952

(22) Filed: Jul. 12, 2016

(65) Prior Publication Data

US 2016/0316911 A1 Nov. 3, 2016

Related U.S. Application Data

(63) Continuation of application No. PCT/AT2014/000210, filed on Nov. 26, 2014.

(30) Foreign Application Priority Data

Jan. 23, 2014 (AT) .................................. A 45/2014

(51) Int. Cl.
*A47B 88/10* (2006.01)
*A47B 88/493* (2017.01)
(52) U.S. Cl.
CPC ............ *A47B 88/10* (2013.01); *A47B 88/493* (2017.01); *A47B 2210/004* (2013.01); *A47B 2210/0035* (2013.01)
(58) Field of Classification Search
CPC ..... A47B 88/10; A47B 88/493; A47B 88/437; A47B 2210/0035; A47B 2210/004; F16C 9/04
(Continued)

(56) References Cited

U.S. PATENT DOCUMENTS 5,417,496 A * 5/1995 Hobbs .................. F16C 29/04
384/18
7,690,740 B2 * 4/2010 Blum .................. A47B 88/437
312/334.33
(Continued)

FOREIGN PATENT DOCUMENTS

CN 101347291 1/2009
CN 201230725 5/2009
(Continued)

OTHER PUBLICATIONS

International Search Report dated Mar. 3, 2015 in International (PCT) Application No. PCT/AT2014/000210.
(Continued)

*Primary Examiner* — Daniel J Troy
*Assistant Examiner* — Timothy M Ayres
(74) *Attorney, Agent, or Firm* — Wenderoth, Lind & Ponack, L.L.P.

(57) ABSTRACT

A drawer pull-out guide includes a carcass rail to be fixed to a furniture carcass, an extension rail displaceable relative to the carcass rail between a closed position and an open position, and a rolling body and a supporting body movable along a running limb of the carcass rail and a running surface of the extension rail upon a movement of the extension rail. A clearance is formed on the running limb of the carcass rail and/or on the running surface of the extension rail. The rolling body is accommodated within the clearance in the closed position of the extension rail and is thereby relieved from the load of the extension rail so that, in the closed position of the extension rail, the load of the extension rail is carried by the supporting body. Furthermore, rolling body and the supporting body are arranged in a common running carriage.

17 Claims, 7 Drawing Sheets

(58) Field of Classification Search
USPC .............. 312/334.6, 334.11–334.21, 334.25,
312/334.26, 334.36–334.43
See application file for complete search history.

(56) References Cited

U.S. PATENT DOCUMENTS

| | | | |
|---|---|---|---|
| 2006/0091770 A1* | 5/2006 | Ritter | A47B 88/493 |
| | | | 312/334.13 |
| 2008/0258592 A1* | 10/2008 | Blum | A47B 88/437 |
| | | | 312/334.1 |
| 2009/0232426 A1 | 9/2009 | Hammerle | |
| 2014/0348447 A1 | 11/2014 | Foster et al. | |

FOREIGN PATENT DOCUMENTS

| | | |
|---|---|---|
| CN | 102112023 | 6/2011 |
| CN | 103492735 | 1/2014 |
| DE | 197 51 384 | 6/1998 |
| DE | 20 2004 007 109 | 6/2005 |
| EP | 1 959 794 | 8/2008 |
| EP | 2 079 342 | 7/2009 |
| GB | 515899 | 12/1939 |

OTHER PUBLICATIONS

Search Report dated Oct. 22, 2014 in Austrian Application No. A 45/2014, with English translation.
English translation of Search Report dated Jul. 5, 2017 in Chinese Application No. 201480073840.9.

\* cited by examiner

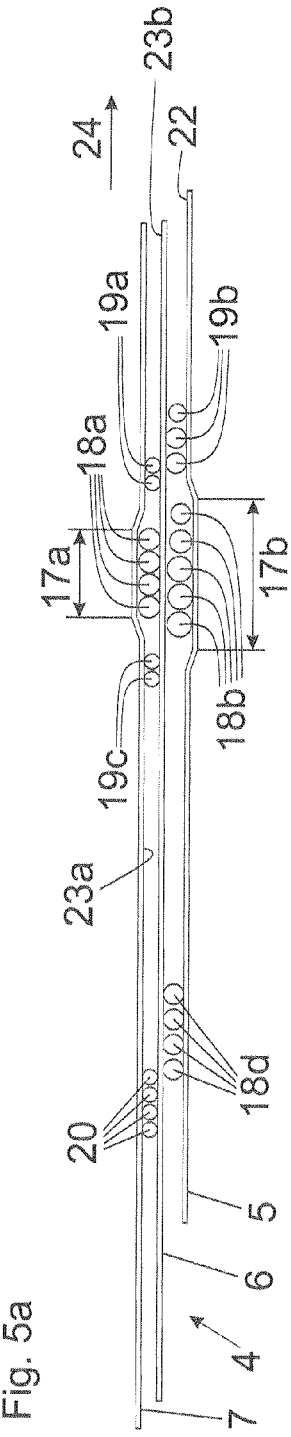
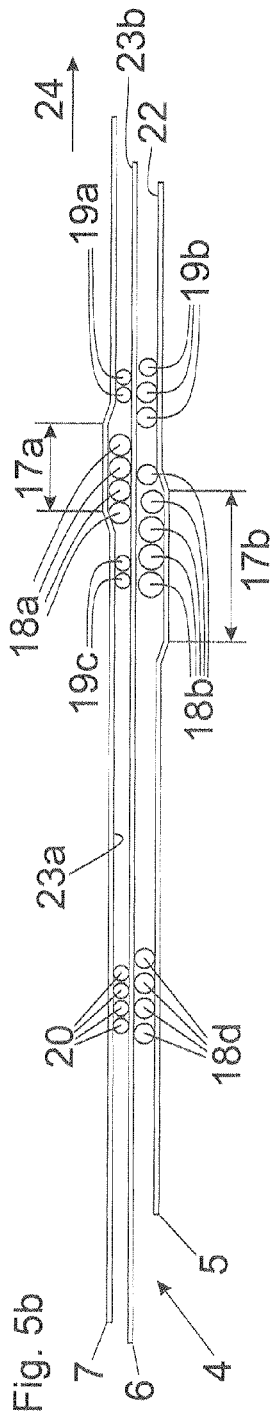
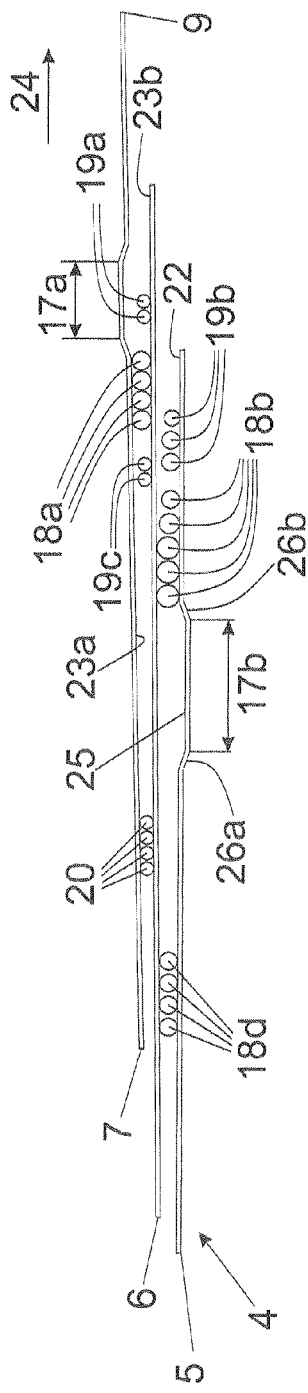

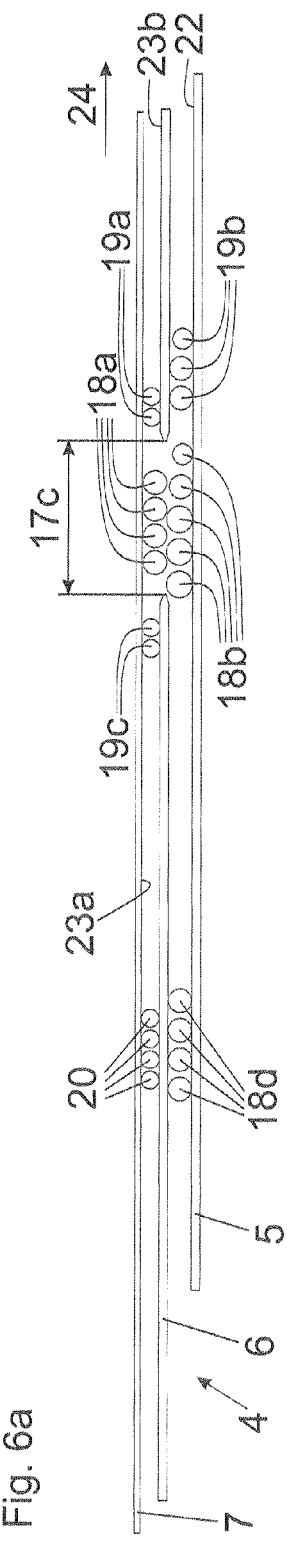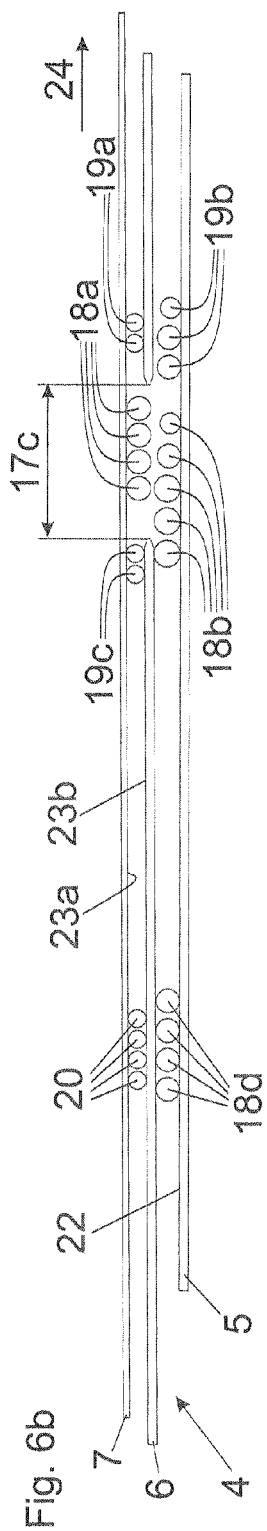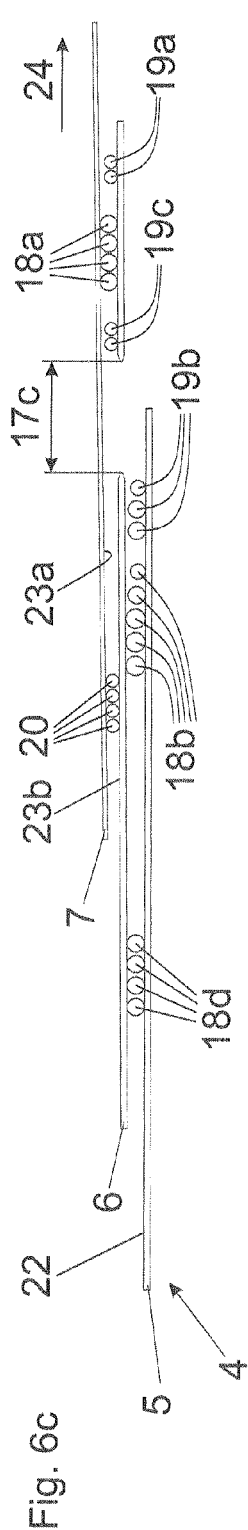

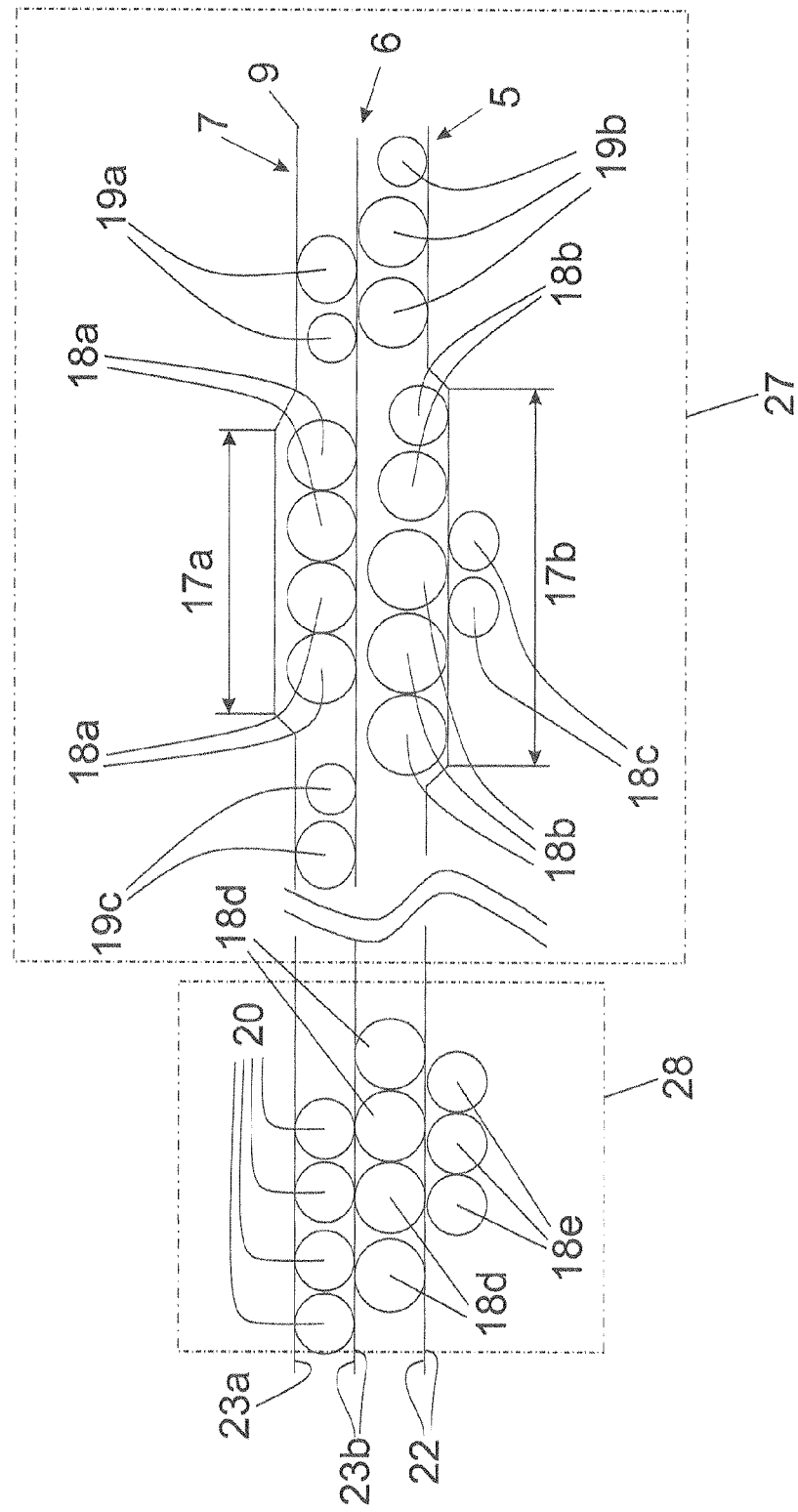

DRAWER PULL-OUT GUIDE

BACKGROUND OF THE INVENTION

The present invention relates to a drawer pull-out guide, including a carcass rail to be fixed to a furniture carcass, at least one extension rail which is displaceable relative to the carcass rail between a closed position and an open position, and at least one rolling body and at least one supporting body which are movable along a running limb of the carcass rail and a running surface of the extension rail upon a movement of the extension rail. A clearance is arranged on the running limb of the carcass rail and/or on the running surface of the extension rail, and the at least one rolling body is accomodated within the clearance in the closed position of the extension rail. The at least one rolling body is thereby relieved from the load of the extension rail such that, in the closed position of the extension rail, the load of the extension rail is carried by the at least one supporting body.

The invention further concerns an arrangement with a drawer pull-out guide of the kind to be described and with a drawer which is movable relative to a furniture carcass by way of the drawer pull-out guide in the mounting position.

With such drawer pull-out guides, the load of the drawer is transmitted by rolling bodies which are subjected to different loading conditions. After a longer standstill of the drawer in the closed position, the foremost rolling bodies—particularly because of the considerable weight of a drawer front panel—bear the greatest load which leads in the course of time to a peripheral deformation, flattening, or even to a breakage of the rolling bodies. Due to this mechanical stress exerted on the rolling bodies, the running behaviour and thus the functionality of the drawer pull-out guide can adversely be affected which results in a shorter lifetime.

A measure for avoiding such a flattening of rolling bodies is described in EP 2 079 342 B1 to the applicant. Here, a running carriage having a group of rolling bodies is displaceable between the rails, and at least one further load-transmitting element is supported on a front cantilever of the running carriage—with a spacing to the group of rolling bodies. In the closed position of the extension rail, the load of the drawer is carried by the load-transmitting element so that the group of rolling bodies, in the closed position, are substantially relieved and thus protected from deformation. In an open position of the extension rail, the load-transmitting element is moved over the front end of a rail of the drawer pull-out guide, and the load of the extension rail is carried by the group of rolling bodies. However, also in the closed position of the extension rail, the group of rolling bodies is partly subjected to a load which can lead to a deformation of the rolling bodies. Also, the construction of the shown running carriage is a special form which is relatively voluminous and causes extra manufacturing costs.

DE 197 51 384 A1 and GB 515,899 A each show pull-out devices for drawers, in which several rollers which are spaced from each other in the longitudinal direction of the extension rail are rotatably arranged on the extension rail. In the closed position, the rollers can run into dents of the stationary rail so that the rollers are relieved from the weight of the drawer and an undesired opening movement of the pull-out devices is prevented. A disadvantage is the fact that a relatively great force is required in order to open the pull-out device, because the rollers each need to be moved out of their associated dents. This leads to abrupt transitions when opening and closing the extension guides which adversely affect the running behaviour of the extension guide. Moreover, the diameters of the rollers are to be dimensioned relatively large for reasons of stability, whereby the installation space is significantly enlarged.

SUMMARY OF THE INVENTION

It is an object of the present invention to provide a drawer pull-out guide of the kind generally referred to above, but without the above drawbacks.

According to the invention, the at least one rolling body and the at least one supporting body are arranged in a common running carriage.

By way of the arrangement in a common running carriage, the rolling resistance of the drawer pull-out guide can be reduced, because the diameter of the rolling bodies and of the supporting bodies in comparison with stationary rollers can be significantly smaller. The transitions between the closed position and the open position result practically without stoppage, wherein the distribution of load of the drawer pull-out guide is effected more uniformly.

In the closed position, the at least one rolling body is accomodated within the clearance (expanded space) of a rail and is thus relieved from the load of the extension rail, while the at least one supporting body is located outside of the clearance and thereby carries the load of the extension rail. The at least one rolling body which is located within the clearance in the closed position of the extension rail is not subjected to any weight force and therefore not subjected to premature wear.

It is thereby irrelevant whether the supporting body located outside of the clearance is subjected to the weight force of the drawer in the closed position and will therefore be deformed or not, because the supporting body, in an open position of the extension rail, does not act as a rolling body rolling along a running limb and therefore does not have any influence on the running behaviour of the drawer pull-out guide.

The advantage of this construction firstly lies in a clear functional separation of the dynamic rolling bodies (i.e. the ones which roll along a running limb of the rails upon a movement of the extension rail) and the static rolling bodies (i.e. the ones which carry the load of the drawer in the closed position of the extension rail). Furthermore, in comparison with the construction according to EP 2 079 342 B1, running carriages with a shorter length and with a cheaper construction are also applicable. In particular, running carriages with a standard design can be easily used which need not to be equipped with additional components.

Preferably, the at least one rolling body and the at least one supporting body are made of a plastic material. If required, for example when there is a considerable load due to a heavy drawer front panel, the at least one supporting body may be also made of steel.

According to an embodiment of the invention, two or more rolling bodies can be provided which, in the closed position of the extension rail, are accommodated within the clearance. Thereby, preferably at least two of the two or more rolling bodies have different diameters. As a result, a stepped configuration of the diameters of the rolling bodies can be provided, namely such that the diameters of the rolling bodies decrease in a direction towards the front end of the extension rail, preferably monotonously (continuously). This has the particular advantage that the weight forces with an extension rail extracted and being under load (namely when the front end of the extension rail flexes downwardly) are distributed more evenly onto the rolling bodies having different diameters.

With a two-part rail system, the extension rail can be configured as a drawer rail to be connected to the drawer. With a three-part rail system, which enables a full extension of a drawer relative to the front face of the furniture carcass, the extension rail can be configured as a drawer rail and/or as a central rail.

According to an embodiment, the at least one supporting body can also be in the form of a rolling body. It is, however, not mandatory that the supporting body rolls off along a running limb of a rail upon a movement of the extension rail.

BRIEF DESCRIPTION OF THE DRAWINGS

Further details and advantages of the present invention will be explained by way of the exemplary embodiments shown in the Figures, wherein:

FIG. 5a-5c show a time sequence of the opening process of the drawer pull-out guide in highly schematized views, FIG. 6a-6c show a time sequence of the opening process of the drawer pull-out guide in highly schematized views, wherein a clearance (expanded space) in the form of an opening or recess is arranged in a running surface of the central rail, FIG. 7 is a highly schematized view of the drawer pull-out guide with rolling bodies and supporting bodies having different diameters.

DETAILED DESCRIPTION OF THE INVENTION

Figure 1:
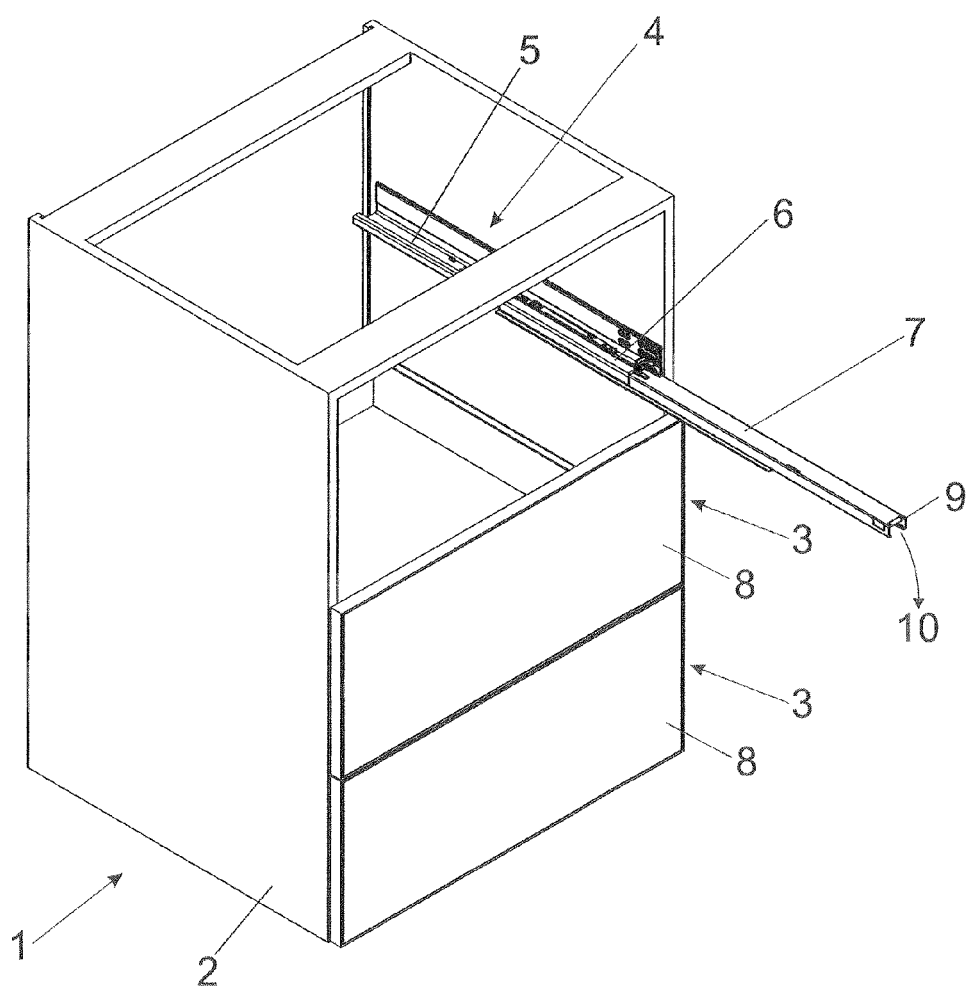
FIG. 1 is a perspective view of an item of furniture with drawers which are movably supported relative to a furniture carcass by way of drawer pull-out guides.

FIG. 1 shows a perspective view of an item of furniture 1 with drawers 3 which are displaceable relative to a furniture carcass 2 by way of drawer pull-out guides 4. The drawer pull-out guide 4, in the shown embodiment, is configured as a full-extension pull-out guide having a three-part rail system, in which a carcass rail 5 is to be fixed to the furniture carcass 2, a drawer rail 7 is to be fixed to the drawer 3, and a central rail 6 is displaceable between the carcass rail 5 and the drawer rail 6. For movably supporting the rails 5, 6, 7 to each other, rolling bodies (not visible here) are provided (reference numbers 18a-18e and 20 in FIG. 4a) which are arranged in or on a running carriage 27 (FIG. 4b) displaceable between the rails 5, 6, 7. The drawer pull-out guide 4, in the shown Figure, is in the fully open position, and those rolling bodies 18a, 18b which are located adjacent to the front end 9 of the drawer rail 7 are considerably subjected to the load of the drawer front panel 8 in a direction of the shown arrow 10, in particular when the drawer 3 remains in the fully closed position over a longer period of time. This loading, with the time, can lead to deformations or also to a breakage of the, in particular foremost, rolling bodies 18a, 18b so that the functionality of the drawer pull-out guide 4 can no longer be ensured.

Figure 2:
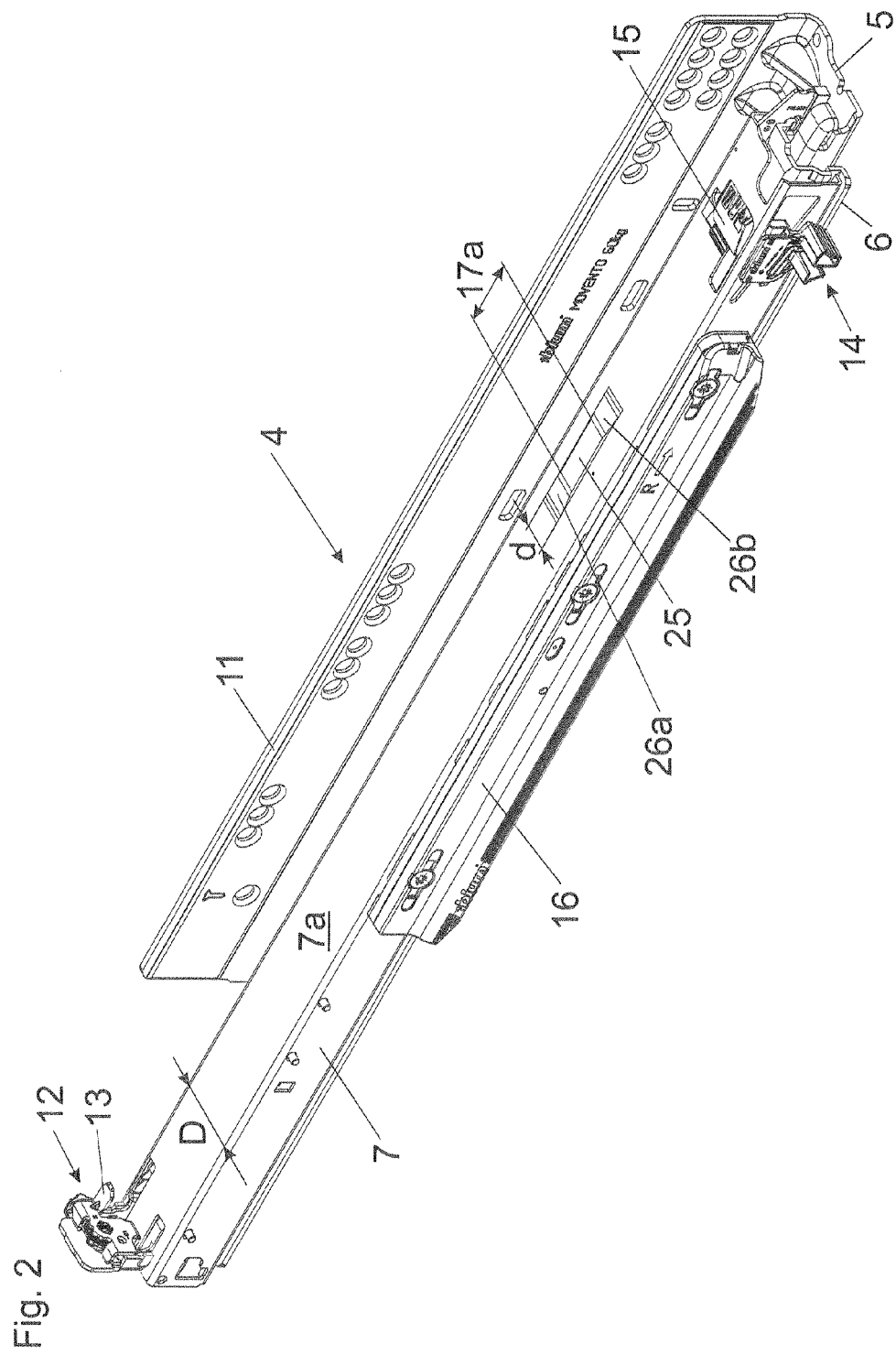
FIG. 2 shows a drawer pull-out guide in a perspective view.

FIG. 2 shows the drawer pull-out guide 4 in a perspective view. The carcass rail 5 is to be fixed to the furniture carcass 2 by a fastening section 11, while the drawer rail 7 is to be connected to the drawer 3. A displaceable central rail 6 is arranged between the stationary carcass rail 5 and the drawer rail 7, whereby a full extension of the drawer 3 relative to the furniture carcass 2 is possible. The drawer rail 7 is provided with a fastening device 12 having an adjustable peg 13, wherein by an adjustment of the peg 13 (which is to be arranged within a bore of the drawer rear wall), the rear end region of the drawer 3 can be raised and lowered. In this way, the inclination of the front panel 8 (FIG. 1) relative to the furniture carcass 2 can be adjusted. An adjusting device 14 with a height-adjustable stop 15 allows the height of the front panel 8 to be adjusted in the mounting position. The drawer pull-out guide 4 further includes a spring-assisted retraction device 16 so that the drawer rail 7 (and therewith the drawer 3), at the end of the closing movement, can be pulled with spring force into the fully closed end position.

Visible is a clearance (expanded space) 17a arranged on the drawer rail 7, the clearance 17a is in the form of an embossing protruding upwardly in the mounting position and which can be haptically recognized, the clearance 17a is provided for accommodating the rolling bodies 18a which are arranged between the rails 5, 6, 7 so as to relieve pressure on the rolling bodies 18a when the drawer is closed. The clearance 17a has a substantially flat base 25, wherein the rolling bodies 18a are movable into the clearance 17a via at least one inclined surface portion 26a, 26b. In this way, the rolling bodies 18a can be moved into and out of the clearance 17a without abutting an edge. The drawer rail 7 has a horizontal limb 7a with a width (D), wherein the width (d) of the clearance 17a is smaller than the width (D) of the horizontal limb 7a of the drawer rail 7. In this way, the drawer rail 7 will not be locally weakened by the arrangement of the clearance 17a. The clearance 17a, in the shown embodiment, is located in the foremost third of the length of the drawer rail 7.

Figure 3:
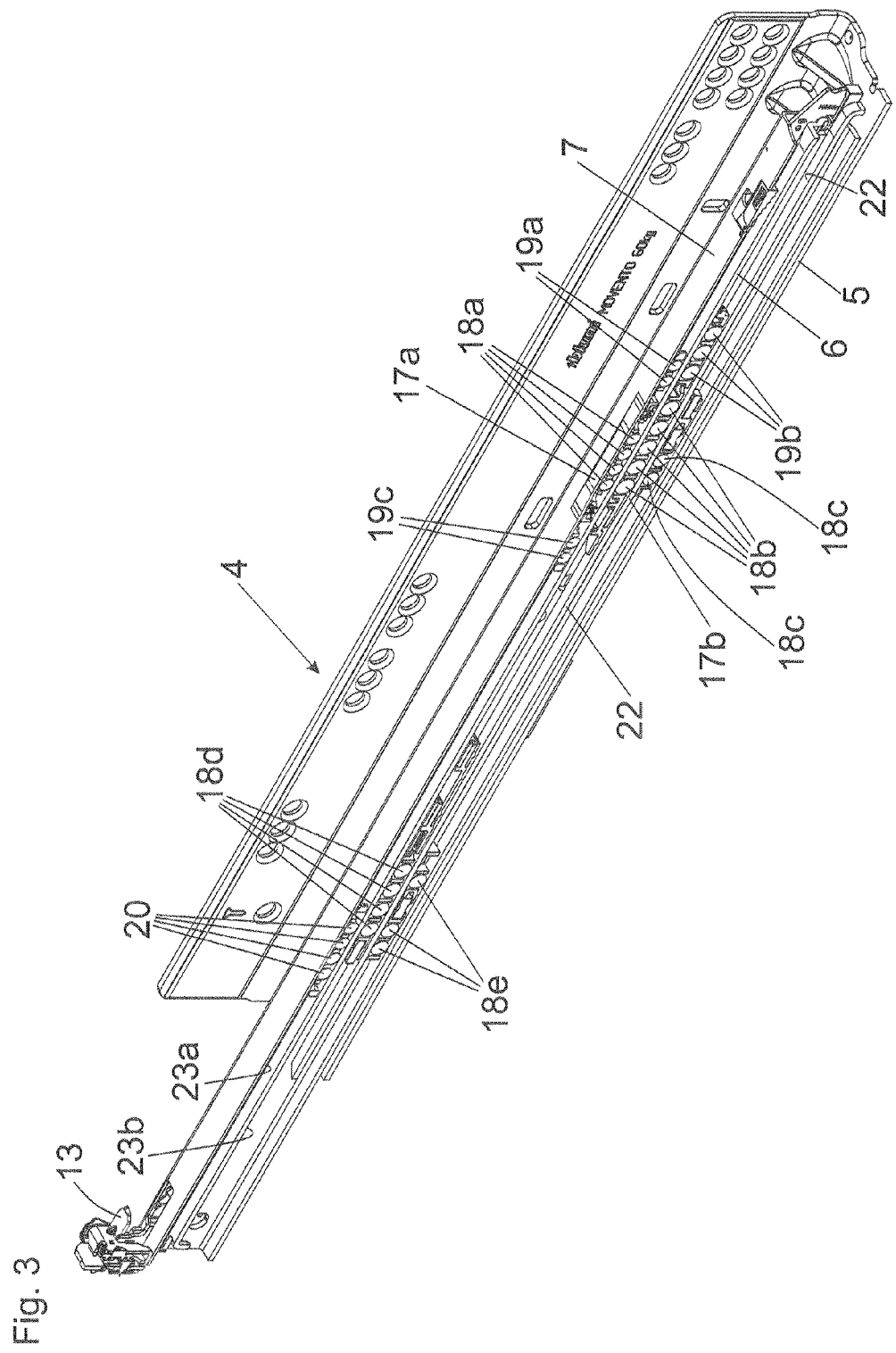
FIG. 3 is a perspective cross-section view of the drawer pull-out guide according to FIG. 2 in a closed position.

FIG. 3 shows a perspective cross-section of the drawer pull-out guide 4 according to FIG. 2 in the fully closed position. Arranged between the central rail 6 and the drawer rail 7 is at least one rolling body 18a (in the present case four rolling bodies 18a) which can be rolled along a running surface 23a of the drawer rail 7 which extends in a longitudinal direction of the drawer rail 7. In the closed position, the rolling bodies 18a are accommodated within the clearance 17a of the drawer rail 7 and are thereby relieved from the load of the drawer rail 7. Moreover, there is arranged at least one supporting body 19a (in the present case, two supporting bodies 19a) between the central rail 6 and the drawer rail 7, the supporting body 19a bearing the load of the drawer 3 in the closed position of the drawer rail 7. In the shown embodiment, both supporting bodies 19a are also configured as rolling bodies. The rolling bodies 18a arranged within the clearance 17a are thus spaced by the formation of a gap from the running surface 23a of the drawer rail 7 and are thus not subjected to vertical forces which could cause deformation or breakage of the rolling bodies 18a. In the closed position of the drawer rail 7, the weight force is carried by the supporting bodies 19a and 19c which are located to the left and to the right of the rolling bodies 18a.

Moreover, in the shown embodiment, the running limb 22 of the carcass rail 5 is also provided with a clearance (expanded space) 17b. The clearance 17b, as well as the clearance 17a, can be formed as a depression or recess in the carcass rail 5 which accommodates the rolling bodies 18b (which are arranged between the carcass rail 5 and the central rail 6) in the closed position. In this way, the rolling bodies 18b, in the closed position, are relieved from the load of the drawer 3 and protected from deformation, and the load in that case is carried by the supporting bodies 19b.

Arranged below the rolling bodies 18b there are at least two rolling bodies 18c which bear against the underside of the running limb 22 of the carcass rail 5. The rolling bodies 18c resting against the underside of the running limb 22, together with the running bodies 18b and the rolling bodies 18d and 18c spaced therefrom, are arranged in a common running carriage 27 (see FIG. 7). In the rear end region, a separate running carriage is provided for accommodating the rolling bodies 20. The rolling bodies 20 are arranged between the central rail 6 and the drawer rail 7.

Figure 4A:
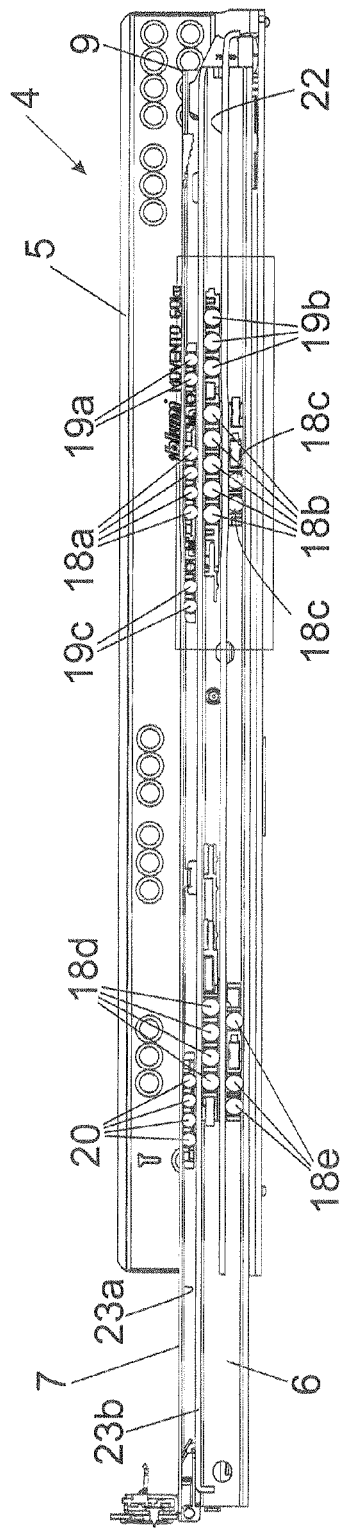
FIG. 4a, 4b show the drawer pull-out guide in a cross-section and an enlarged detail view thereof.

FIG. 4a shows the drawer pull-out guide 4 in a cross-section. The carcass rail 5 has the running limb 22, the central rail 6 has a running surface 23b, and the drawer rail 7 has a running surface 23a along which the various rolling bodies 18a-18e can roll off. The rolling bodies 18a and 18b, in the closed position of the drawer pull-out guide 4, are each relieved by the arrangement of a clearance 17a, 17b. The weight force, in the closed position, is carried by the supporting bodies 19a, 19b, 19c.

Figure 4B:
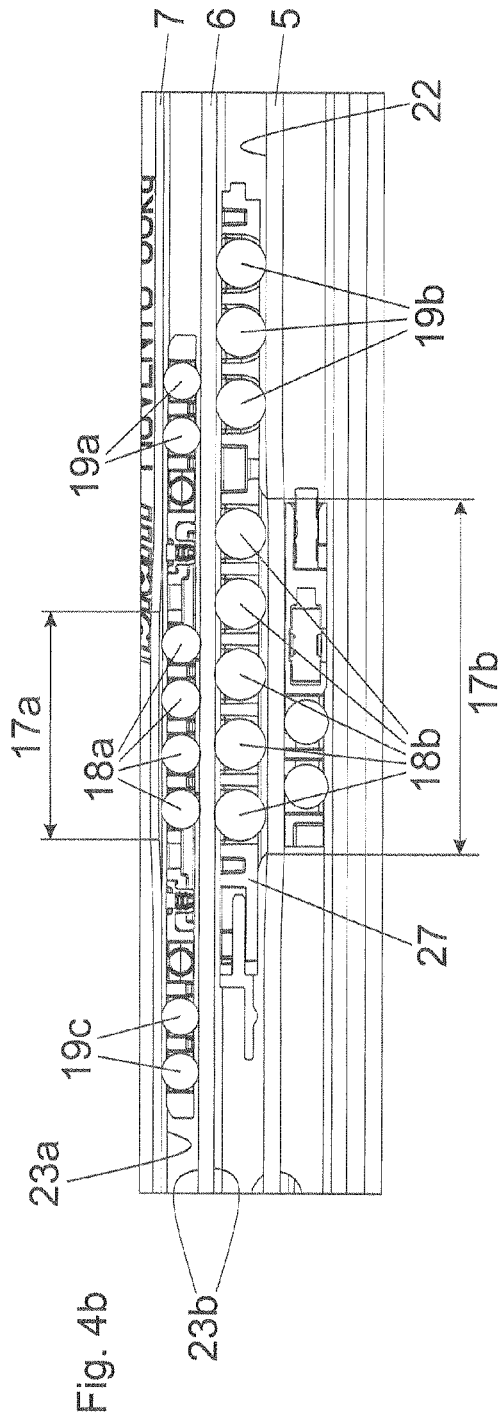

FIG. 4b shows the framed region of FIG. 4a in an enlarged view. The running limb 22 of the carcass rail 5 has a trough-shaped clearance (expanded space) 17b in which the rolling bodies 18b are accommodated in the closed position of the drawer pull-out guide 4 and are thus relieved from the occurring weight force. In the lower plane, the load is carried by the front supporting bodies 19b. The clearance 17a is formed in the running surface 23a of the drawer rail 7. In the upper plane, the load is carried by the supporting bodies 19a, 19c. It is also possible to provide a clearance (expanded space) 17a, 17b in the upper and lower running surface 23b of the central rail 6 for relieving the rolling bodies 18a, 18b, whereby these can be relieved in the closed position of the drawer pull-out guide 4. According to an embodiment, at least two of the two or more rolling bodies 18a, 18b, which are arranged within the common running carriage 27 have different diameters. Thereby, it is advantageous when the diameters of the rolling bodies 18a 18b, in a direction towards the front end 9 of the extension rails 6, 7, decrease continuously, whereby the weight force, in an open position of the drawer pull-out guide 4, is distributed more uniformly onto the rolling bodies 18a, 18b. In this sense, it is also beneficial when the diameters of the supporting bodies 19a, 19b, 19c are smaller than the diameters of the rolling bodies 18a, 18b. In the shown Figure, two or more supporting bodies 19a, 19b, 19c are provided which, in the closed position of the drawer pull-out guide 4, are located outside the clearances (expanded spaces) 17a, 17b and thereby carry the load of the drawer 3. The supporting bodies 19a, 19b, 19c each can have the same diameter. According to an alternative embodiment, the diameters of the supporting bodies 19a, 19b, in a direction towards the front end 9 of the drawer pull-out guide 4, can also decrease continuously so that each foremost supporting body 19a, 19b is smaller than the other supporting bodies 19a, 19c.

FIG. 5a-5c show (highly schematized) the sequence of the opening process of the drawer pull-out guide 4. In the fully closed position according to FIG. 5a, both the upper rolling bodies 18a and the lower rolling bodies 18b are each arranged within a common clearance (common expanded space) 17a and 17b, wherein the upper half expanded space 17a is formed in the running surface 23a of the drawer rail 7 and the lower half expanded space 17b is formed in the running limb 22 of the carcass rail 5. In this way, the rolling bodies 18a and 18b are relieved from the load of the drawer 3. In the closed position, the load rests on the lower and upper supporting bodies 19a, 19b, 19c which are located outside the clearances (expanded spaces) 17a, 17b. When now the drawer rail 7 is being moved in the extension direction 24 by a person, the rolling bodies 18a and the rolling bodies 18b are moved, one after the other, out of their associated clearances 17a, 17b (FIG. 5b) and are loaded by the drawer rail 7. Instead of the supporting bodies 19a, 19b, 19c, the rolling bodies 18a, 18b interact with the running limb 22 of the carcass rail 5 and with the running surface 23a of the drawer rail 7, respectively, as shown in FIG. 5c. In FIG. 5c, it can also be seen that the drawer rail 7, by way of the choice of diameter of the rolling bodies, is arranged in a slight inclined position, wherein the front side end 9 of the drawer rail 7 faces upwards. The inclined position is, however, compensated for by the load of the drawer 3 so that the drawer 3 eventually can be moved in a (ideal) horizontal plane. Moreover, the inclined position of the drawer rail 7 improves the engagement of the rolling bodies 18a, 18b when closing the drawer 3. The diameter of the rolling bodies 18a, 18b and the diameter of the supporting bodies 19a, 19b can reduce in a direction towards the front end 9 of the drawer rail 7. The clearances (expanded spaces) 17a, 17b each have a substantially flat base surface portion 25 and inclined surface portions 26a, 26b (FIG. 5c), whereby the rolling bodies 18a, 18b can be moved into the clearances 17a, 17b without abutting an edge and with little effort.

FIG. 6a-6c show schematically a further embodiment of the drawer pull-out guide 4, wherein a clearance (expanded space) 17c in the form of an opening or recess is arranged in the running surface 23b of the central rail 6. In the closed position according to FIG. 6a, the rolling bodies 18a are located within the clearance 17c of the central rail 6 and are thus relieved from the load of the drawer rail 7. In the closed position, the load of the drawer rail 7 is carried by the supporting bodies 19a, 19c. By way of the clearance 17c, also the lower rolling bodies 18b are relieved, while the load in this plane is carried by the lower supporting bodies 19b. Upon a movement of the drawer rail 7 in extension direction 24, the central rail 6 is initially elevated by the interaction of the rolling body 18a with the central rail 6, wherein the lower supporting bodies 19a are relieved. Upon a further movement of the drawer rail 7 in extension direction 24 (FIG. 6c), the supporting bodies 19a and 19c are relieved because the drawer rail 7 now rests on the rear rolling bodies 20 and on the rolling bodies 18a having a larger diameter. Thus, the drawer rail 7 is slightly in an inclined position, wherein the front end of the drawer rail 7 faces upward. The inclined position is however compensated for by the loading so that the drawer rail 7 is substantially horizontally displaceable over the entire movement path.

FIG. 7 show a possible embodiment of a drawer pull-out guide 4 in a highly schematized view. The carcass rail 5 has upper and lower running limbs 22, the central rail 6 has upper and lower running surfaces 23b, and the drawer rail 7 has a running surface 23a along which rolling bodies 18a, 18b, 18c, 18d, 20 can be rolled off. A first clearance (expanded space) 17a is arranged in the running surface 23a of the drawer rail 7, and a second clearance (expanded space) 17b is arranged in the upper running limb 22 of the carcass rail 5. The clearances 17a, 17b are each configured so as to jointly accommodate at least two, preferably three or more, rolling bodies 18a, 18b of the running carriage 27 (FIG. 4b) therein. The rolling bodies 18a, 18b, 18c, together with the supporting bodies 19a, 19b, 19c, are arranged in a common running carriage 27, while the rolling bodies 20, 18d, 18e are accommodated in a (schematically shown) running carriage 28 which is separate therefrom.

According to an embodiment, the rolling bodies 18a are those rolling bodies having the greatest diameter in the upper plane (i.e. between the central rail 6 and the drawer rail 7), wherein the rolling bodies 18*a* have an equal diameter. The diameter of the smaller rollers of the rolling bodies 19*a*, 19*c* each have a diameter less than 95% of the diameter of rolling bodies 18*a*, the diameter of the greater rollers of the rolling bodies 19*a* and 19*c* each have a diameter less than 96% of the diameter of the rolling bodies 18*a*. The rolling bodies 18*b* located in the lower plane (i.e. between the carcass rail 5 and the central rail 6) are preferably the ones having the largest diameters of the entire drawer pull-out guide 4, so that the largest occurring diameter of the lower rolling bodies 18*b* is larger than the largest occurring diameter of the upper rolling bodies 18*a*. In the shown Figure, the diameter of the lower rolling bodies 18*b* arranged in a common running carriage 27 reduces, preferably continuously, in a direction towards the front end 9 of the drawer pull-out guide 4, whereby the weight forces, with the drawer pull-out guide 4 in an extended condition and under load, are distributed more evenly onto the rolling bodies 18*b* having a different diameter. The smallest diameter of the lower rolling bodies 18*b* has a diameter which is approximately 98% of the diameter of the largest rolling body 18*b*. Also, at least three supporting bodies 19*b* can be provided within a common running carriage 27, and the diameter of the supporting bodies 19*b* in the common running carriage 27 reduces, preferably monotonously (continuously), in a direction toward the front end 9 of the drawer pull-out guide 4. The rolling bodies 20, 18*d*, 18*e* are arranged within a running carriage 28 which is separate from the first running carriage 27 and each have a different diameter, and the rolling bodies 20 are smaller than the rolling bodies 18*e* and the rolling bodies 18*e* are smaller than the rolling bodies 18*d*.

The applied rolling bodies 18*a*, 18*b*, 18*c* (as well as the rolling bodies 18*d*, 18*e* and 20) are each arranged within a common running carriage 27 and 28, respectively, in which they are held with a predetermined spacing relative to each other. The rolling bodies 18*a*, 18*b*, 18*c*, 18*d*, 18*e*, 20 also can have different shapes, for example in the form of balls, cylindrical rollers, discs, pins, tapered rollers or tons. According to an embodiment, at least two, preferably three or more, rolling bodies 18*a*, 18*b* can jointly be accommodated within a common clearance 17*a*, 17*b*, 17*c*.

The invention claimed is:

1. A drawer pull-out guide comprising:
a carcass rail configured to be fixed to a furniture carcass,
an extension rail displaceable relative to the carcass rail between a closed position and an open position, and
at least two rolling bodies and a supporting body movable along a running limb of the carcass rail and a running surface of the extension rail upon a movement of the extension rail,
wherein the carcass rail, the extension rail, the at least two rolling bodies, and the supporting body are configured such that an expanded space is arranged on at least one of i) the running limb of the carcass rail and ii) the running surface of the extension rail, such that the at least two rolling bodies are accommodated within the expanded space in the closed position of the extension rail so as to be relieved from a load of the extension rail, and such that the load of the extension rail is carried by the supporting body in the closed position of the extension rail,
wherein the at least two rolling bodies and the supporting body are arranged in a common running carriage, and
wherein diameters of the at least two rolling bodies decrease in a direction towards a front end of the extension rail.

2. The drawer pull-out guide according to claim 1, wherein the at least two rolling bodies to be arranged within the expanded space in the closed position of the extension rail are loaded by the extension rail in the open position of the extension rail.

3. The drawer pull-out guide according to claim 1, wherein the supporting body is relieved from the load of the extension rail in the open position of the extension rail.

4. The drawer pull-out guide according to claim 1, wherein the at least two rolling bodies are accommodated within a common expanded space in the closed position of the extension rail.

5. The drawer pull-out guide according to claim 1, wherein a diameter of the supporting body is smaller than the diameters of the at least two rolling bodies.

6. The drawer pull-out guide according to claim 1, wherein the supporting body is one of at least two supporting bodies located outside the expanded space in the closed position of the extension rail so as to carry the load of the extension rail.

7. The drawer pull-out guide according to claim 6, wherein at least two of the at least two supporting bodies have an identical diameter.

8. The drawer pull-out guide according to claim 6, wherein the diameters of the at least two supporting bodies decrease in a direction towards the front end of the extension rail.

9. The drawer pull-out guide according to claim 8, wherein the diameters of the at least two supporting bodies continuously decrease in a direction towards the front end of the extension rail.

10. The drawer pull-out guide according to claim 1, wherein the expanded space is formed of a depression in at least one of the carcass rail and the extension rail.

11. The drawer pull-out guide according to claim 10, wherein the expanded space has a substantially flat base surface portion and at least one inclined surface portion, configured such that the at least two rolling bodies can be moved into and out of the expanded space by the at least one inclined surface portion.

12. The drawer pull-out guide according to claim 1, wherein the expanded space is formed of an opening or a recess in at least one of the carcass rail and the extension rail.

13. The drawer pull-out guide according to claim 1, further comprising a drawer rail configured to be fixed to a drawer, and a central rail displaceable between the carcass rail and the drawer rail, wherein the extension rail is formed of at least one of the central rail and the drawer rail.

14. An arrangement comprising:
a furniture carcass,
a drawer mounted to the furniture carcass so as to be displaceable relative to the furniture carcass, and
the drawer pull-out guide according to claim 1 configured and arranged to allow the drawer to be displaceable relative to the furniture carcass.

15. The drawer pull-out guide according to claim 1, wherein the at least two rolling bodies comprises at least three rolling bodies.

16. The drawer pull-out guide according to claim 15, wherein the diameters of the at least three rolling bodies continuously decrease toward the front end of the extension rail.

17. The drawer pull-out guide according to claim 1, wherein the diameters of the at least two rolling bodies continuously decrease toward the front end of the extension rail.

* * * * *